Nov. 10, 1936.  C. A. CAMPBELL  2,060,028
FLUID PRESSURE BRAKE
Filed Nov. 23, 1934
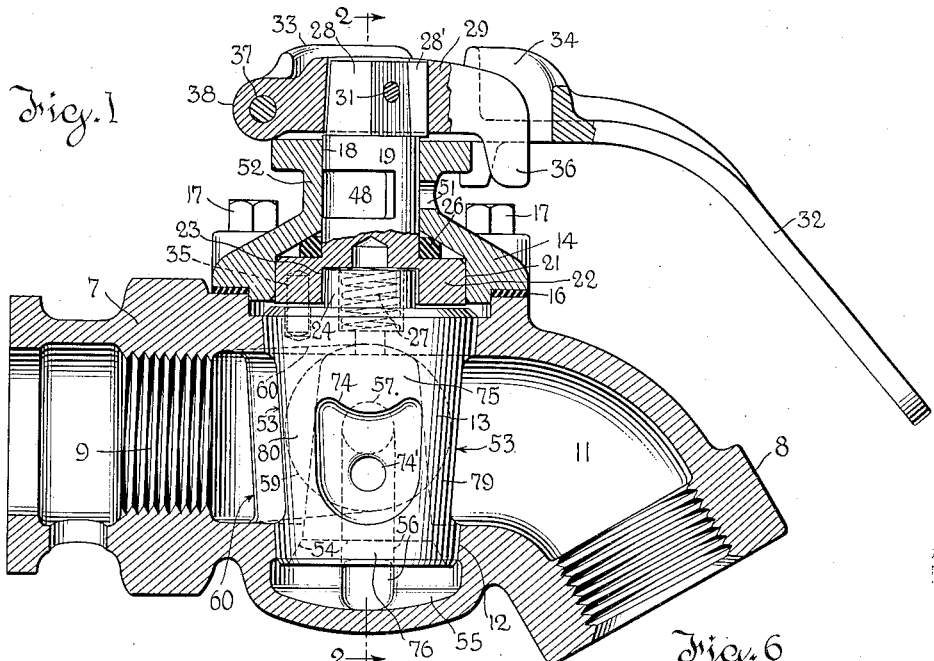
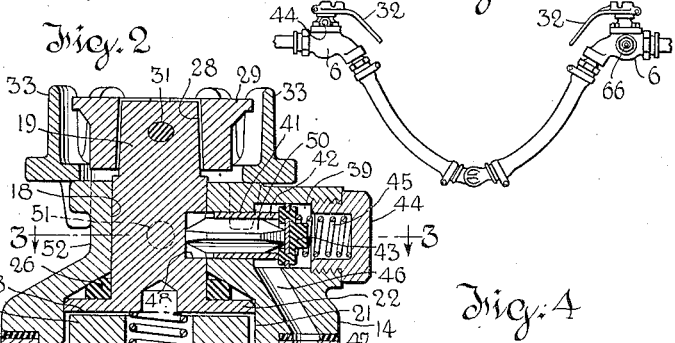
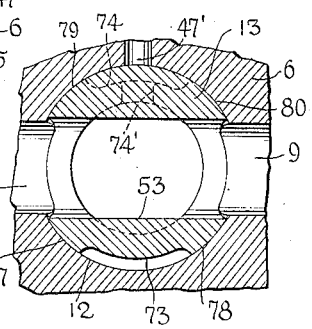
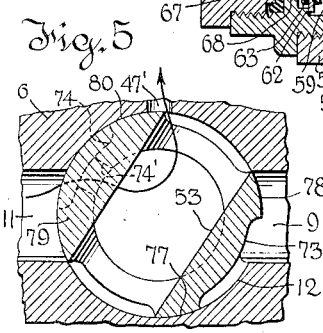
Inventor
Charles A. Campbell
By Dodge And Sons
Attorneys Patented Nov. 10, 1936

2,060,028

UNITED STATES PATENT OFFICE 2,060,028

FLUID PRESSURE BRAKE

Charles A. Campbell, Watertown, N. Y., assignor to The New York Air Brake Company, a corporation of New Jersey Application November 23, 1934, Serial No. 754,491

17 Claims. (Cl. 303—86)

This invention relates to fluid pressure brakes, and more particularly to angle cock devices such as are employed in railway fluid pressure brake systems.

Various types of angle cocks have been proposed in which a shunt passage or by-pass is provided around the cock plug, so that even though an angle cock should be closed, either accidentally or maliciously, communication through the brake pipe is not interrupted and the engineer still has full control of the braking system throughout the length of the train.

In these devices, there is a safety valve adapted for manual control to close the by-pass and effect venting of the hose side of the angle cock when it is desired to uncouple the hoses between an adjoining pair of closed angle cocks.

An important object of the present invention is to furnish an improved angle cock device of the above type having by-pass means, manually controlled valve means for closing the by-pass means, and venting means, all of which insure a high degree of efficiency and safety in the functioning of the device both under running and repair conditions.

A feature of the improved angle cock is the arrangement whereby neither of the manually controlled by-pass valves on an adjoining pair of angle cocks will remain closed, when operated, unless both by-pass valves are held in closed position at the same time. This causes both by-pass valves to remain closed and enables the operator to perform the uncoupling operation without fear of injury, since closure of these valves also results in complete venting of pressure fluid from the hoses. The above, together with the requirement that both angle cocks be closed before the by-pass valves will remain closed and the location of the manual control means for the by-pass valves so that it is difficult, if not impossible, for a person riding on the train to close the two by-pass valves simultaneously, prevents an unauthorized rider from cutting off flow of pressure fluid through the brake pipe as is frequently done to stop the train.

When undertaking repair work on a hose coupling, such as replacing worn gaskets or the like, the repairman first closes the adjoining angle cocks and their by-pass valves. After the work is completed, the repairman frequently fails to open both angle cocks, with the result that the engineer has no control over the brakes to the rear of the closed cock. A feature of the present angle cock is the provision whereby, when only one of a pair of closed adjoining angle cocks is opened, the safety by-pass valves on both angle cocks automatically open to reestablish continuous brake pipe communication throughout the train whereby the brakes may be applied and released in the usual manner.

Provision is also made in the device to preclude movement of the cock plug to a "dead spot", so that the main passage through the angle cock is closed and yet the venting means are not open to exhaust the pressure fluid in adjoining hoses preparatory to uncoupling.

Other features will be apparent from the following detailed description and the accompanying drawing illustrating a practical embodiment of the device.

Fig. 1 of the drawing is a longitudinal vertical section through the normally full open angle cock;

Fig. 2 is a section on line 2—2 of Fig. 1, showing the normally closed side vent valve and the normally open by-pass valve;

Fig. 3 is a section on line 3—3 of Fig. 2, showing the vent valve operating means;

Fig. 4 is a partial section on line 4—4 of Fig. 2, showing the relation of the ports and passages in the cock plug and the angle cock body when the plug is in full open position;

Fig. 5 is a similar section, showing the cock plug rotated in a counter-clockwise direction to a point in its closing movement at which communication between the main passage in the plug and the main passage in the cock body has just been fully closed off and the side vent is in communication with the main passage of the plug; and Fig. 6 is a side elevation showing a pair of the angle cocks interposed in a train line.

Referring particularly to Figs. 1 and 2, the angle cock body 6 has a tapped extension 7 adapted for connection to a brake pipe and an opposite, tapped extension 8 adapted for connection to a hose and coupling assembly. Main passage 9 on the car side of the angle cock and main passage 11 on the hose side open into a central bore 12 in which is mounted a cock plug 13. Chamber 12 is closed at the top by a cap 14 sealed by a gasket 16 and secured to the cock body by cap screws 17.

Cap 14 has an annular opening 18 through which extends a drive shaft 19. Opening 18 is enlarged at 21 to receive an annular flange 22 on the lower end of shaft 19. A groove 23 in the lower face of flange 22 and a rib 24 on cock plug 13 projecting into said groove provide the operating connection between the plug and shaft 19.

A sealing ring 26 is located between flange 22 and cap 14. A spring 27 interposed between plug 13 and shaft 19 constantly urges the plug into sealing engagement with the cock body, and flange 22 into sealing engagement with ring 26 and the latter with cap 14.

Shaft 19 is squared at 28 to receive a handle socket member 29 rigidly secured thereon by a staking pin 31. Rib 28' on shaft 19 engaging a corresponding groove in socket member 29 precludes improper assembly of the parts. The operating handle 32 for the cock plug has a yoke portion 33 surrounding socket member 29 and formed with a slot 34 in which a lug 36 on member 29 is located. A pin 37 extending through a perforated lug 38 on socket member 29 and into openings (not shown) in yoke portion 33 of the handle connects the handle and socket member 29 together for unitary rotary movement. In addition, this construction permits limited upward tilting of the handle for the purpose of locking the handle to and unlocking it from cap 14 in either its full open or full closed position. This locking arrangement forms no part of the present invention, and, hence further description thereof is unnecessary.

Lug 36 on socket member 29 is adapted for engagement with a pair of stops (not shown) on cap 14 in order to define the extreme positions (the full open and full closed positions which are substantially 90° apart) to which handle 32 may be swung.

A dowel pin 35 on shaft 19, projecting into a corresponding socket in plug 13, prevents improper assembly of the shaft and the plug. This, together with rib 28' on the drive shaft, assures correct positioning of the handle 32 relative to the cock plug.

As shown in Figs. 2 and 3, cap 14 has a chamber 39 from which leads a reduced passage 41 communicating with passage 18. Bushing 42 secured in passage 41 projects into chamber 39 to form a seat for a disc valve 43. Cap nut 44 closes the outer end of chamber 39 and a coil spring 45 serves normally to maintain valve 43 closed. Communicating passages 46 and 47 in cap 14 and body 6, respectively, connect chamber 39 with plug bore 12. However, the inner end 47' of passage 47 is sealed by cock plug 13 when the latter is in open position (see Fig. 2).

Shaft 19 has a tapered cam groove 48 into the deepest end 49 of which normally projects a grooved unseating member 50 slidably arranged in bushing 42 (Fig. 3). The length of member 50 is such that in the normal, open position of the cock, check valve 43 remains seated. Thus, this valve forms a seal against passage of pressure fluid beyond the valve should there be leakage from between the cock plug and its bore into vent passage 47. Shaft 19 and cap 14 also provide a seal at the inner end of passage 41.

When handle 32 is swung in a counter-clockwise direction (as viewed in Figs. 3, 4, and 5) to close the cock plug, the bottom of cam groove 48 forces member 50 outwardly and unseats check valve 43 against the resistance of spring 45. An atmospheric vent port 51 is so located in neck portion 52 of cap 14 that, when handle 32 is moved to closed position, cam groove 48 registers with the vent port (as indicated in dotted lines in Fig. 3) to provide communication between the interior of bushing 42 and the vent. Since check valve 43 is unseated at this time, communication between passages 46, 47, and atmospheric vent port 51 is established.

As shown in Fig. 4, main passage 53 in plug 13 alines with main passages 9 and 11 in cock body 6 in the open position of the cock plug, to permit free passage of pressure fluid through the device. Cock plug 13 is of the open bottom type since it has a passage 54 leading from passage 53 into constant communication with a recess 55 in the lower part of the cock body. A passage 56 connects recess 55 with the interior of a valve seat bushing 57 secured in an internal boss 57' in body 6. The cock body also is formed with a boss 58 having a chamber 59 surrounding valve seat 57 and communicating with main passage 9 on the car side of the cock plug by way of a passage 60 partially encircling the plug (Fig. 1).

Boss 58 is tapped to receive a cap nut 61, and the latter is counterbored to provide a shoulder 62. The cap nut forms a guide for a disc valve 63 normally held off its seat 57 and against shoulder 62 by a comparatively light-tensioned spring 64. It will thus be clear that passage 9 on the car side of the angle cock communicates freely with the interior of cock plug 13 in all positions of the plug, if valve 63 is in its normal open position.

Cap nut 61 is threaded to receive a closure cap 66. This cap engages a flexible, cup-shaped diaphragm 67 within nut 61 to seal the periphery of the diaphragm against flange 68 on the nut. Cap 66 has an opening 69 through which extends a valve seating plunger or button 70 having an enlarged end 71 seated in a recess in the diaphragm. Shoulder 71' on the plunger serves as a stop to limit outward movement of the plunger and the diaphragm. A central projection 72 on the diaphragm engages valve 63 and serves to seat it on bushing 57 against the resistance of spring 64 when plunger 70 is manually forced inwardly. Under certain conditions explained later, valve 63 remains tightly closed when the manual force applied to plunger 70 is removed.

Diaphragm 67, while permitting necessary movement of plunger 70 to operate valve 63 without excessive resistance due to fluid pressure on the diaphragm, also positively prevents leakage to atmosphere past the plunger. The plunger and diaphragm arrangement provides for direct manual operation of valve 63, thereby considerably simplifying this part of the device and rendering its functioning more positive and reliable. Depression 66' in cap nut 66 protects plunger 70 from external damage.

When the cock plug is open passage 54, recess 55, passage 56, bushing 57 and passage 60 constitute an open line of communication paralleling that through main passages 9, 11, and 53 of the angle cock. Hence, upon a heavy flow of pressure fluid through the main conduit, there will be a similar flow of less intensity from passage 56 into and through recess 55, and in certain cases, in a reverse direction. Thus, any tendency of foreign substances to collect in chamber 55 beneath the cock plug is reduced to a minimum.

Cock plug 13 has a pair of external, diametrically-opposed recesses 73, 74 arranged at right angles to main passage 53. A passage 74' provides constant communication between recess 74 and plug passage 53. Insofar as the construction permits, the contours of recesses 73 and 74 are made similar to the cross-sectional shape of passage 53. There is thus formed on the plug an upper, annular bearing surface 75 and a similar lower bearing surface 76 (Fig. 2) connected together by four longitudinal sealing surfaces 77,

78, 79, and 80 (Fig. 4). This provides a very uniform external bearing surface for the plug and reduces leakage.

It will be noted from Fig. 5 that, when the cock plug is rotated counter-clockwise into closed position, the plug cuts off communication between the car side and the hose side of the angle cock through the main conduit formed by passages 9, 11, and 53. However, at this time recess 74 in the plug is in alignment with hose passage 11. This places the hose passage in communication with the interior of the plug, and, since the latter is in communication with car passage 9 by way of recess 55, passage 56, bushing 57 and passage 60, there is provided a by-pass which insures communication between the hose and car sides of the angle cock even though the cock be closed. The engineer thus has control of the brakes in both the open and closed positions of the cock.

It was explained that closing of the cock plug causes plunger 50 to unseat check valve 43 and connect cam groove 48 with vent port 51 so as to vent passage 47 to the atmosphere. As shown in Fig. 5, movement of the plug into closed position also causes main passage 53 in the plug to register with vent passage 47 and vent the interior of the plug. Since, as explained, main passages 9 and 11 communicate with the interior of the cock plug when the latter is closed, venting of both the car and hose sides of the closed angle cock to the atmosphere takes place. This provides a continuous audible vent indicating that the angle cock is not in open position.

When the operator desires to cut off entirely the flow of pressure fluid from main passage 9 on the car side to the hose side of the closed plug, as when repair work is to be done on the hose coupling, plunger 70 is manually pressed inwardly against the resistance of spring 64 to seat valve 63. This closes the by-pass and terminates flow from passage 9 to the interior of the cock plug, main passage 11, and vent passage 47. As a result, there is a drop in pressure in passage 11, the interior of the plug, passage 56, and bushing 57, since the interior of the plug is still being vented by passage 47. When this pressure drops to a certain value, even though the plunger be released, valve 63 will remain seated against the resistance of spring 64 due to brake pipe pressure in chamber 59 acting on the outer face of the valve. If the plungers on a pair of adjoining closed cocks are both operated to close their corresponding by-pass valves, it is clear that the car sides of the cocks will be cut off from their venting passages 47 and the hoses, and the pressure fluid remaining in the hoses and between the hoses and the by-pass valves will be exhausted to the atmosphere through the side vents.

In order to protect the operator fully in performing the uncoupling operation, the improved angle cock construction is such that neither of the by-pass valves of the adjoining cocks will remain closed upon release of manual pressure on the plunger, unless the operator holds both of the valves closed at the same time while the two cocks are closed. In this event both by-pass valves remain closed. This is accomplished by relative proportioning of the flow capacities of the main passage through the angle cock, the by-pass, the side vent and the tension of spring 64 so that the differential of fluid pressure exerted across the manually closed by-pass valve, when the by-pass valve of the adjoining cock is open, is insufficient to overcome the tension of spring 64. As a result, when the operator releases plunger 70, the by-pass valve immediately reopens. However, if both cocks are closed and their by-pass valves 63 are held closed simultaneously by the operator, the resulting quick drop of pressure in valve seat bushings 57 effected by the venting means and the action of brake pipe pressure on valves 63 will cause them to remain seated even though the operator releases either or both plungers 70. It follows that, after pressure fluid is completely vented from the hoses, they may be safely uncoupled.

After the hoses have been uncoupled, they may be recoupled and the adjoining angle cocks opened (Fig. 6). This causes the fluid pressure on both sides of the by-pass valves to equalize again, whereupon creep springs 64 force the valves open to safety position. If only one angle cock should be opened, sufficient pressure fluid will be released therefrom to the hose side of the closed angle cock to flood the venting capacity of its exhaust passage 47. As a result, the pressure in the hoses and in chamber 55, passage 56, and bushing 57 of each angle cock will be raised so that it is only slightly less than brake pipe pressure. The differential of fluid pressure across valves 63 will now be sufficiently low to permit their springs 64 to unseat the valves. Thus, even though only one angle cock be opened, the by-pass of the other cock opens automatically to reestablish brake pipe communication throughout the train and insure full control of the brakes by the engineer.

If only one of the adjoining angle cocks should be closed by the operator, neither by-pass valve 63 can be made to stay closed even by holding both by-pass valves closed at the same time by means of their plungers. As explained above, when one angle cock is open and the other is closed, the differential of fluid pressure across the by-pass valves is so slight that, when released from manual pressure, they are opened automatically by their springs 64.

An objection to the side vent type angle cocks now in use is that the cock plug may be rotated to an intermediate position in which the main conduit through the device is closed off without the side vent opening. Such a position forms a so-called "dead spot" at which no audible signal is given by pressure fluid escaping from the vent to indicate that the main passage is closed. Likewise, when moved to such position the closed vent prevents exhausting of pressure fluid from adjoining hoses preparatory to uncoupling.

The present construction overcomes these objections by providing for opening of the side vent slightly in advance of complete closure of the main conduit. In other words, there is an "overlap" between these two conditions. Referring to Fig. 5, it will be seen that the arrangement is such that, as the plug is rotated towards closed position, first recess 74 alines with passage 11 and provides communication between plug passage 53 and the hose side of the angle cock before passage 53 moves out of registry with passages 9 and 11. This insures communication between passages 9 and 11 through the by-pass before the main conduit is closed so that there is no position of the angle cock in which the brakes are not under the engineer's control.

As the closing movement of the cock plug continues, passage 53, while still communicating with passages 9 and 11, moves into partial registry with vent passage 47, at the beginning of which registry vent valve 43 starts to open and cam groove 48 communicates with port 51 to vent passage 47. Thus, the plug passage and passages 9 and 11 are connected to the side vent before the plug completely closes the main conduit, so that the desired signal is produced by the pressure fluid escaping from port 51 and the venting means exhausts the pressure fluid from the hoses.

In completing its closing movement, the plug first cuts off direct communication between main passages 9 and 11, as shown in Fig. 5, and then, when entirely closed, i. e., rotated 90° relative to the position of Fig. 4, provides full communication between plug passage 53 and vent passage 47.

It will be noted that the hose side and the car side of the angle cock are in constant communication with the interior of the cock plug and thus with each other, except that the car side is closed off completely when the plug and the by-pass valve are both closed. When the plug is closed, the hose and car sides communicate through the by-pass and both sides are vented from the interior of the plug. Closure of the by-pass valve at this time isolates the car side from the rest of the angle cock, but permits venting of the hose side to continue.

What is claimed is:—

1. The combination of a pair of adjoining angle cocks interposed in a train line, each of said cocks including a brake pipe controlling valve, normally open valve means controlling communication through a by-pass around the brake pipe controlling valve and adapted for manual operation to close the by-pass, and means for causing the by-pass valve means to remain closed upon release of manual pressure holding said valve means closed only when both brake pipe controlling valves are closed and the by-pass valve means of both cocks are manually held in closed position at the same time.

2. The combination of a pair of adjoining angle cocks interposed in a train line, one of said cocks including a brake pipe controlling valve, normally open valve means controlling communication through a by-pass around the brake pipe controlling valve and adapted for manual operation to close the by-pass, and means, controlled by the brake pipe controlling valve, for causing the by-pass valve means to remain closed upon release of manual pressure holding said valve means closed only when the brake pipe control valve and the by-pass valve means of said angle cock are in closed position and pressure fluid flow to the hose from the other cock is completely cut off at the same time.

3. The combination of a pair of adjoining angle cocks interposed in a train line, each of said cocks including a brake pipe controlling valve, normally open valve means controlling communication through a by-pass around the brake pipe controlling valve and adapted for manual operation to close the by-pass, and means, controlled by the brake pipe controlling valve, serving normally to effect opening of the by-pass valve means, but operating to permit brake pipe pressure to hold the by-pass valve means closed upon release of manual pressure holding said valve means closed, only when both brake pipe controlling valves are closed and the by-pass valve means of both cocks are manually held in closed position at the same time.

4. The combination of a pair of adjoining angle cocks interposed in a train line, each of said cocks including a brake pipe controlling valve, a valve controlling communication through a by-pass around the brake pipe controlling valve and subject, when closed, to brake pipe pressure tending to maintain the by-pass valve closed and hose pressure tending to open the valve, spring means tending to open the by-pass valve, manual means to hold the by-pass valve closed against the resistance of the spring means, and means adapted upon closure of the brake pipe controlling valve to vent the hose side of the angle cock to atmosphere, the strength of the spring means and the capacity of the venting means being such that, to maintain the by-pass valve closed upon release of manual pressure, both brake pipe controlling valves must be closed and both by-pass valves manually held in closed position at the same time.

5. The combination of a pair of adjoining angle cocks interposed in a train line, each of said cocks including a closed brake pipe controlling valve, a valve controlling communication through a by-pass around the brake pipe controlling valve and maintained closed by brake pipe pressure against the tendency of hose pressure to open the valve, spring means also tending to open the by-pass valve, and means venting the hose side of the angle cock to atmosphere, the capacity of the venting means and the strength of the spring means being such that, upon the opening of either brake pipe controlling valve, hose pressure will increase sufficiently to open both by-pass valves.

6. The combination of a pair of adjoining angle cocks interposed in a train line and closed to prevent passage of pressure fluid to the hoses between the cocks, each of said cocks including a closed brake pipe controlling valve and one of said cocks including a valve controlling communication through a by-pass around the brake pipe controlling valve and maintained closed by brake pipe pressure against the tendency of hose pressure to open the valve, spring means also tending to open the by-pass valve, and means, controlled by the brake pipe controlling valve, venting the hose side of the angle cock to atmosphere, the capacity of the venting means and the strength of the spring means being such that, upon opening of either brake pipe controlling valve, hose pressure will increase sufficiently to open the by-pass valve.

7. The combination of a pair of adjoining angle cocks interposed in a train line, each of said cocks including a closed brake pipe controlling valve, valve means controlling communication through a by-pass around the brake pipe controlling valve and maintained closed by brake pipe pressure, and means venting the hose side of the angle cock to atmosphere and controlled by the brake pipe controlling valve, whereby both of said by-pass valve means are caused to open upon opening of either brake pipe controlling valve.

8. The combination with an angle cock having a brake pipe controlling valve dividing the angle cock into a car side and a hose side, of a valve controlling communication through a by-pass around the brake pipe controlling valve and subject, when closed, to brake pipe pressure tending to maintain the by-pass valve closed and hose pressure tending to open the valve; spring means urging the by-pass valve towards open position, manually controlled means to close the by-pass valve against the resistance of the spring means; and means, adapted upon closure of the brake pipe control valve, to vent the hose side of the angle cock to atmosphere.

9. An angle cock comprising a cock body; a brake pipe controlling valve dividing the angle cock into a car side and a hose side; a normally open valve controlling communication through a by-pass around the brake pipe controlling valve and subject, when closed, to brake pipe pressure tending to maintain the by-pass valve closed and hose pressure tending to open the valve; spring means urging the by-pass valve towards open position; manual means to hold the by-pass valve closed against the resistance of the spring means; and means adapted upon closure of the brake pipe control valve to vent the hose side of the angle cock to atmosphere, the strength of the spring means and the capacity of the venting means being such that, when the brake pipe control valve and the by-pass valve are closed, brake pipe pressure will overcome the combined tendency of the spring means and the reduced hose pressure to open the by-pass valve and thereby maintain said valve in closed position upon release of the manual means.

10. An angle cock comprising a cock body having a main conduit; a manually operable controlling valve dividing said conduit into a car side and a hose side and adapted when closed to interrupt direct communication between the car side and the hose side of the conduit, the angle cock having a by-pass around the controlling valve; manually operable valve means for closing the by-pass; and means for automatically venting the hose side of the main conduit when the controlling valve is closed.

11. An angle cock device comprising a brake pipe cock having a by-pass for establishing communication from one side to the other, a brake pipe controlling valve, and a manually operable valve for directly and completely shutting off communication through the by-pass.

12. An angle cock device comprising a brake pipe cock having a by-pass for establishing communication from one side to the other, a brake pipe controlling valve, and a mechanically operable valve for directly and completely shutting off communication through the by-pass.

13. An angle cock device comprising a brake pipe cock having a by-pass for establishing communication from one side to the other, a brake pipe controlling valve, a valve for permitting or completely shutting off communication through said by-pass and subject, when closed, to brake pipe pressure tending to maintain the by-pass valve closed and hose pressure tending to open the valve, spring means urging the by-pass valve towards open position, and mechanical means for manually closing the by-pass valve against the resistance of the spring means.

14. An angle cock device comprising a brake pipe cock having a by-pass for establishing communication from one side to the other, a brake pipe controlling valve, a valve controlling communication through said by-pass, spring means urging the by-pass valve towards open position, said cock having a passage leading from the by-pass, an imperforate flexible diaphragm sealing the outer end of said passage, and a plunger on the cock adapted for manual actuation to flex the diaphragm and thereby cause the latter to close the by-pass valve against the resistance of the spring means.

15. An angle cock comprising a cock body; a brake pipe valve controlling communication through the main passage of the angle cock and dividing the angle cock into a car side and a hose side; and vent means adapted to communicate the hose side of the cock with the atmosphere and controlled by the position of the brake pipe control valve for preventing complete closure of the main passage by the brake pipe control valve until the vent means are open.

16. The combination in an angle cock of a cock body having an atmospheric vent port, a vent passage, and a main conduit; a cock plug movable between a normal open position in which the plug interrupts communication between the main conduit and the inner end of the vent passage and a closed position in which the plug establishes communication between said conduit and said passage; a disc-type check valve normally interrupting communication through the vent passage; spring means normally maintaining said valve in closed position to interrupt communication through the vent passage; and a reciprocal valve opening member in said passage, said plug having a peripheral cam groove arranged thereon to actuate the valve opening member and provide communication between the outer end of the vent passage and the atmospheric vent port when the plug is closed.

17. An angle cock device comprising a brake pipe cock having a by-pass for establishing communication from one side to the other, a brake pipe controlling valve, a valve controlling communication through said by-pass and normally biased towards open position, said by-pass valve being located entirely within said brake pipe cock and said cock having an opening therein, and an imperforate flexible diaphragm sealing said opening and adapted for manual flexing to close the by-pass valve.

CHARLES A. CAMPBELL.